(12) United States Patent
Miyazaki et al.

(10) Patent No.: US 8,156,630 B2
(45) Date of Patent: Apr. 17, 2012

(54) METHOD OF JOINING MEMBERS

(75) Inventors: Masahiro Miyazaki, Oyama (JP); Yasuji Kawamata, Oyama (JP)

(73) Assignee: Showa Denko K.K., Tokyo (JP)

( * ) Notice: Subject to any disclaimer, the term of this patent is extended or adjusted under 35 U.S.C. 154(b) by 813 days.

(21) Appl. No.: 12/296,151

(22) PCT Filed: Apr. 5, 2007

(86) PCT No.: PCT/JP2007/057637
§ 371 (c)(1),
(2), (4) Date: Oct. 6, 2008

(87) PCT Pub. No.: WO2007/116927
PCT Pub. Date: Oct. 18, 2007

(65) Prior Publication Data
US 2009/0139089 A1 Jun. 4, 2009

(30) Foreign Application Priority Data
Apr. 6, 2006 (JP) .............................. 2006-105699

(51) Int. Cl.
B21D 39/00 (2006.01)
B21D 39/06 (2006.01)
F16L 41/00 (2006.01)
(52) U.S. Cl. ................... 29/522.1; 29/890.044; 403/230
(58) Field of Classification Search ................. 29/523.1, 29/523, 524, 428, 890.044, 890.043, 522.1; 403/230
See application file for complete search history.

(56) References Cited

FOREIGN PATENT DOCUMENTS

| JP | 55-88451 | 8/1978 |
|---|---|---|
| JP | 55-30567 A | 3/1980 |
| JP | 57-103922 A | 6/1982 |
| JP | 63-49330 A | 3/1988 |
| JP | 3-106226 | 11/1991 |
| JP | 04-008818 A | 1/1992 |
| JP | 8-192235 A | 7/1996 |
| JP | 10-118729 A | 5/1998 |
| JP | 11-36859 A | 2/1999 |
| JP | 11-47855 A | 2/1999 |

(Continued)

OTHER PUBLICATIONS

International Search Report, dated Jul. 10, 2007.

(Continued)

*Primary Examiner* — John C Hong
(74) *Attorney, Agent, or Firm* — Westerman, Hattori, Daniels & Adrian, LLP

(57) ABSTRACT

A method for joining members capable of firmly joining a first member made of a tubular member, such as, e.g., a pipe, to a second member is provided. The following items are prepared: a tubular first member 1 having a polygonal cross-section and a hollow portion 3, a second member 5 having an insertion hole 6 with a cross-sectional shape corresponding to a cross-sectional shape of the first member 1, and a split die 11 circumferentially split into multiple segments at positions corresponding to flat wall portions 1a of the first member 1. Then, the first member 1 is inserted into the insertion hole 6 of the second member 5, and the split die 11 is disposed in the hollow portion 3 of the first member 1. Next, each segment 11a of the split die 11 is moved radially outward of the first member 1 toward each corner 1b of the first member. As a result, an insertion portion 2a of the first member 1 inserted in the insertion hole 6 and both sections 2b and 2b axially adjacent to the insertion portions 2a are expanded to join the first member 1 and the second member 5.

16 Claims, 9 Drawing Sheets

FOREIGN PATENT DOCUMENTS

| | | |
|---|---|---|
| JP | 11-047855 A | 2/1999 |
| JP | 2000-140965 A | 5/2000 |
| JP | 2002-224743 | 8/2002 |
| JP | 2003-334625 A | 11/2003 |
| JP | 2005-194996 A | 7/2005 |

OTHER PUBLICATIONS

Extended European Search Report, issued May 11, 2010 for corresponding European Patent Application 07741073.6.
Notification of Reasons for Refusal dated Sep. 13, 2011, issued in corresponding Japanese Patent Application No. 2006-105699.

METHOD OF JOINING MEMBERS

The present application is a U.S. National Stage filing of PCT/JP2007/057637, and claims priority to said PCT application and Japanese Patent Application No. 2006-105699 filed on Apr. 6, 2006, the entire contents of which applications are incorporated herein by reference.

TECHNICAL FIELD

The present invention relates to a method for joining a tubular first member polygonal in cross-section and a second member, and also relates to a joint structure of members.

BACKGROUND ART

Conventionally, the following methods, for example, are known for connecting a pipe to another member.

A pipe is inserted into an insertion hole formed in another member, and a split die circumferentially split into multiple segments is disposed inside a hollow portion of the pipe. Next, by moving each segment of the split die radially outward of the pipe, the insertion portion of the pipe inserted in the insertion hole and both portions of the pipe axially adjacent to the insertion portion are subjected to expansion work (tube diameter expansion work) to thereby join the member to the pipe (for example, see Patent Documents 1 and 2). This method is also called a ridge lock method.

Although it is not a joining method for joining members, as an expansion method for expanding a tubular member using a split die, a method described in the Japanese Unexamined Laid-open Patent Publication No. 2002-224743, for example, is known (see Patent Document 3).

Patent Document 1: Japanese Unexamined Laid-open Patent Publication No. H4-8818 (page 2, FIG. 8)
Patent Document 2: Japanese Unexamined Laid-open Patent Publication No. H11-36859
Patent Document 3: Japanese Unexamined Laid-open Patent Publication No. 2002-224743

DISCLOSURE OF THE INVENTION

Problems to be Solved by the Invention

In the joint structure obtained by a conventional joining method, the pipe was circular in cross-section, so if a load in the circumferential direction of the pipe was applied to the other member, there was a problem that the other member would easily move in the circumferential direction of the pipe.

The present invention was made in view of the aforementioned technical background, and the purpose of the present invention is to provide a joining method capable of firmly joining a second member to a tubular first member, such as, e.g., a pipe, a joint structure of members obtained by the abovementioned joining method, and a joining device for use in the abovementioned joining method.

The other purposes and advantages of the present invention will be made apparent from the following preferred embodiments.

Means to Solve the Problems

The present invention provides the following means.

[1] A method for joining a first member and a second member, wherein the method comprises the steps of inserting the first member made of a tubular member having a hollow portion into an insertion hole provided in the second member, disposing a split die circumferentially split into multiple segments in the hollow portion of the first member, and then moving each of the segments of the split die radially outward of the first member to execute an expansion work of an insertion portion of the first member inserted in the insertion hole and both portions of the first member axially adjacent to the insertion portion to join the first member and the second member, characterized in that, the first member is a tubular member polygonal in cross-section, the insertion hole of the second member is formed into a cross-sectional shape corresponding to a cross-sectional shape of the first member, the split die is split at each position corresponding to each flat wall portion of the first member, and each segment of the split die disposed in the hollow portion of the first member is moved radially outward of the first member toward each corner portion of the first member to execute the expansion work.

[2] The joining method for members as recited in the aforementioned Item 1, wherein the split die has, at its outer peripheral surface, two protruded portions for making both portions of the first member axially adjacent to the insertion portion expand outwardly locally.

[3] The method of joining members as recited in the aforementioned Item 1 or 2, wherein each corner portion of the first member is formed into an approximately circular arc shape in cross-section.

[4] The method of joining members as recited in any one of the aforementioned Items 1 to 3, wherein the second member has a plate portion integrally protruded from a peripheral edge portion of the insertion hole in an axial direction of the first member, and wherein the expansion work is executed in a state in which the plate portion of the second member is fitted on an outer peripheral surface of the first member and the plate portion is prevented by a restraining member positioned on an outer surface of the plate portion from curling up from the outer peripheral surface of the first member.

[5] A joint structure for joining members obtained by the method for joining members as recited in any one of the aforementioned Items 1 to 4.

[6] A joint structure for joining members, wherein, in a state in which a first member made of a tubular member having a hollow portion is inserted into an insertion hole formed in a second member, an insertion portion of the first member in the insertion hole of the second member and both portions of the first member axially adjacent to the insertion portion are expanded, so that the first member and the second member are joined, characterized in that the first member is a tubular member polygonal in cross-section, the insertion hole of the second member is formed into a cross-sectional shape corresponding to a cross-sectional shape of the first member, and at least each corner portion of the first member is expanded.

[7] The joint structure for joining members as recited in the aforementioned Item 6, wherein both portions axially adjacent to the insertion portion of the first member in the insertion hole of the second member are expanded locally outward.

[8] The joint structure for joining members as recited in the aforementioned Item 6 or 7, wherein each corner portion of the first member is formed into an approximately circular arc shape in cross-section.

[9] The joint structure for joining members as recited in any one of the aforementioned Items 6 to 8, wherein the second member has a plate portion integrally protruded from a peripheral edge portion of the insertion hole in the axial direction of the first member, and wherein, in a state in which the plate portion of the second member is fitted on an outer peripheral surface of the first member, an annular restraining member for restraining the plate portion from curling up from the outer peripheral surface of the first member is secured to the plate portion in an outwardly fitted manner.

[10] A joining device for joining a first member and a second member, equipped with a split die circumferentially split into multiple segments, wherein, in a state in which the first member made of a tubular member having a hollow portion polygonal in cross-section is inserted into an insertion hole of the second member having a cross-sectional shape corresponding to a cross-sectional shape of the first member, an expansion work of expanding an insertion portion of the first member in the insertion hole and both portions of the first member axially adjacent to the insertion portion is executed by moving each segment of the split die disposed in the hollow portion of the first member radially outward of the first member, characterized in that the split die is split at each position corresponding to each flat wall portion of the first member, and in a state in which the split die is disposed in the hollow portion of the first member, each segment of the split die is moved radially outward of the first member toward each corner portion of the first member.

[11] The joining device as recited in the aforementioned Item 10, wherein the split die has, at its outer peripheral surface, two protruded portions for making both portions of the first member axially adjacent to the insertion portion expand locally outward.

Effects of the Invention

The present invention has the following effects.

In this specification, in the joint structure in which the second member is joined to the first member, the joint strength of the second member against the load in the circumferential direction of the first member is defined as "twisting strength". Further, the joint strength of the second member against the load in the axial direction of the first member is defined as "pull-out strength".

According to the invention as recited in Item [1], since the first member is a tubular member polygonal in cross-section and the insertion hole of the second member is formed into a cross-sectional shape corresponding to the cross-sectional shape of the first member, the twisting strength can be increased in a state in which the first member is inserted in the insertion hole of the second member. Therefore, even if a load in the circumferential direction of the first member is applied to the second member, the second member does not easily move in the circumferential direction of the first member.

Furthermore, the expansion work is executed by moving each segment of the split die disposed in the hollow portion of the first member radially outward of the first member toward each corner portion of the first member. Thus, each corner portion of the first member is more focally expanded as compared to each flat wall portion of the first member to be largely protruded outward, which further enhances the twisting strength.

In the invention as recited in Item [2], on the outer peripheral surface of the split die, two protruded portions for outwardly and locally expanding both portions of the first member axially adjacent to the insertion portion of the first member are formed. Thus, by executing the expansion work using the split die, both portions of the first member axially adjacent to the insertion portion can be expanded locally outwardly and assuredly. As a result, the pull-out strength assuredly increases. Therefore, even if a load in the axial direction of the first member is applied to the second member, the second member does not easily move in the axial direction of the first member.

In the invention as recited in Item [3], the corner portion of the first member is formed into an approximately circular arc shape in cross-section. Thus, when a load in the circumferential direction of the first member is applied to the second member, the stress concentration on the corner portion of the first member can be assuredly prevented. Therefore, the strength dependability can be improved.

In the invention as recited in Item [4], the plate portion of the second member is fitted and disposed to the outer peripheral surface of the first member, which increases the contact area between the second member and the first member. This further increases the joint strength. Furthermore, the increase in contact area between the second and the first member is performed not by increasing the thickness of the second member but by providing a plate portion to the peripheral edge portion of the insertion hole of the second member. This enables the weight reduction of the joint structure.

In addition, by executing the expansion working in a state in which the plate portion of the second member is prevented from curling out from the outer peripheral surface of the first member by a restraining member disposed on the outer peripheral surface of the plate portion, the plate portion can be assuredly brought into face-to-face contact with the outer peripheral surface of the first member and the joint strength can be assuredly increased.

In the invention as recited in Item [5], a joint structure with high twisting strength can be provided.

In the inventions as recited in Items [6] to [9], the same effects as those of the inventions as recited in Items [1] to [4] can be attained.

According to the inventions as recited in Items [10] and [11], a joining device for suitably use in the joining method for connecting members according to the present invention is provided.

DESCRIPTION OF REFERENCE NUMERALS

Figure 1:
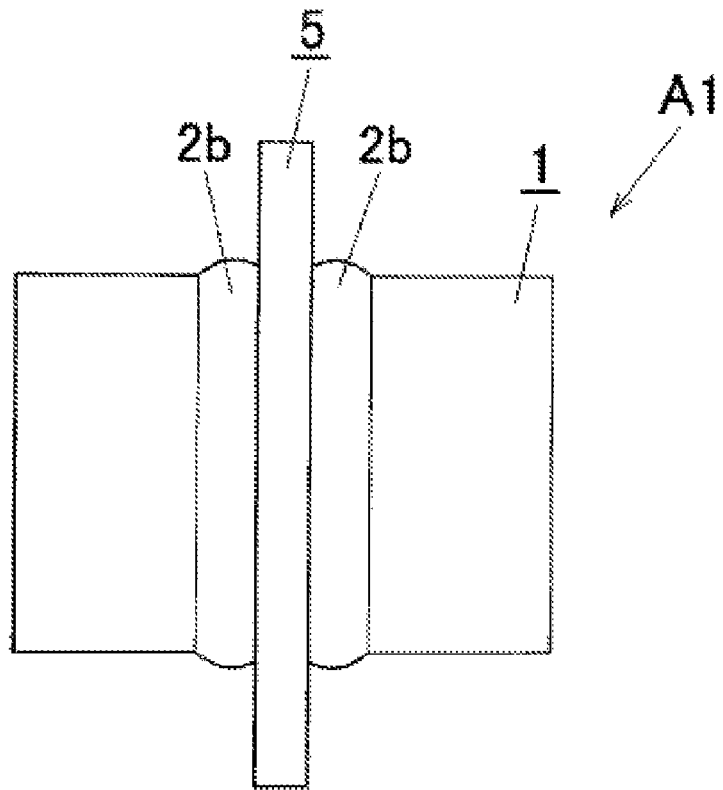
FIG. 1 is a side view of a joint structure according to a first embodiment of the present invention.

A1, A2, A3 . . . joint structure
1 . . . first member
1a . . . flat wall portion
1b . . . corner portion
2a . . . insertion portion
2b . . . portions adjacent to the insertion portion
3 . . . hollow portion
5 . . . second member
6 . . . insertion hole
8 . . . plate portion
10 . . . joining device
11 . . . split die
11a . . . die segment
12 . . . protruded portion
14 . . . wedge hole portion
17 . . . driving means
18 . . . mandrel
18a . . . wedge portion
20 . . . restraining member

BEST MODE FOR CARRYING OUT THE INVENTION

Next, a few preferred embodiments of the present invention will be explained with reference to drawings.

FIGS. 1 to 9 are explanatory views of a joining method and a joining device for joining members according to a first embodiment of the present invention.

Figure 2:
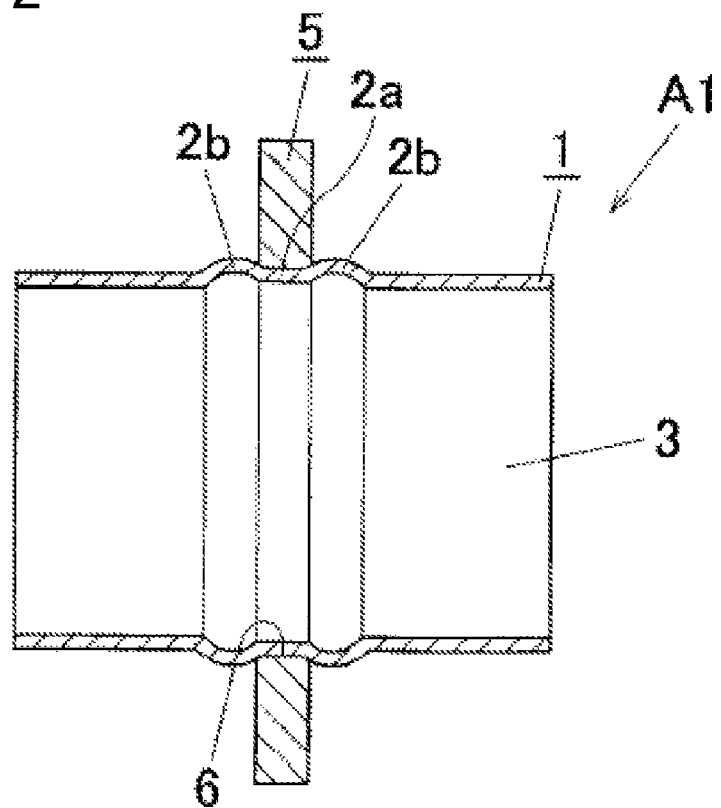
FIG. 2 is a cross-sectional view of the joint structure.

In FIGS. 1 and 2, "A1" denotes a joint structure produced by a joining method for members according to this first embodiment. This joint structure A1 is constituted by joining the first member 1 and the second member 5.

Figure 3:
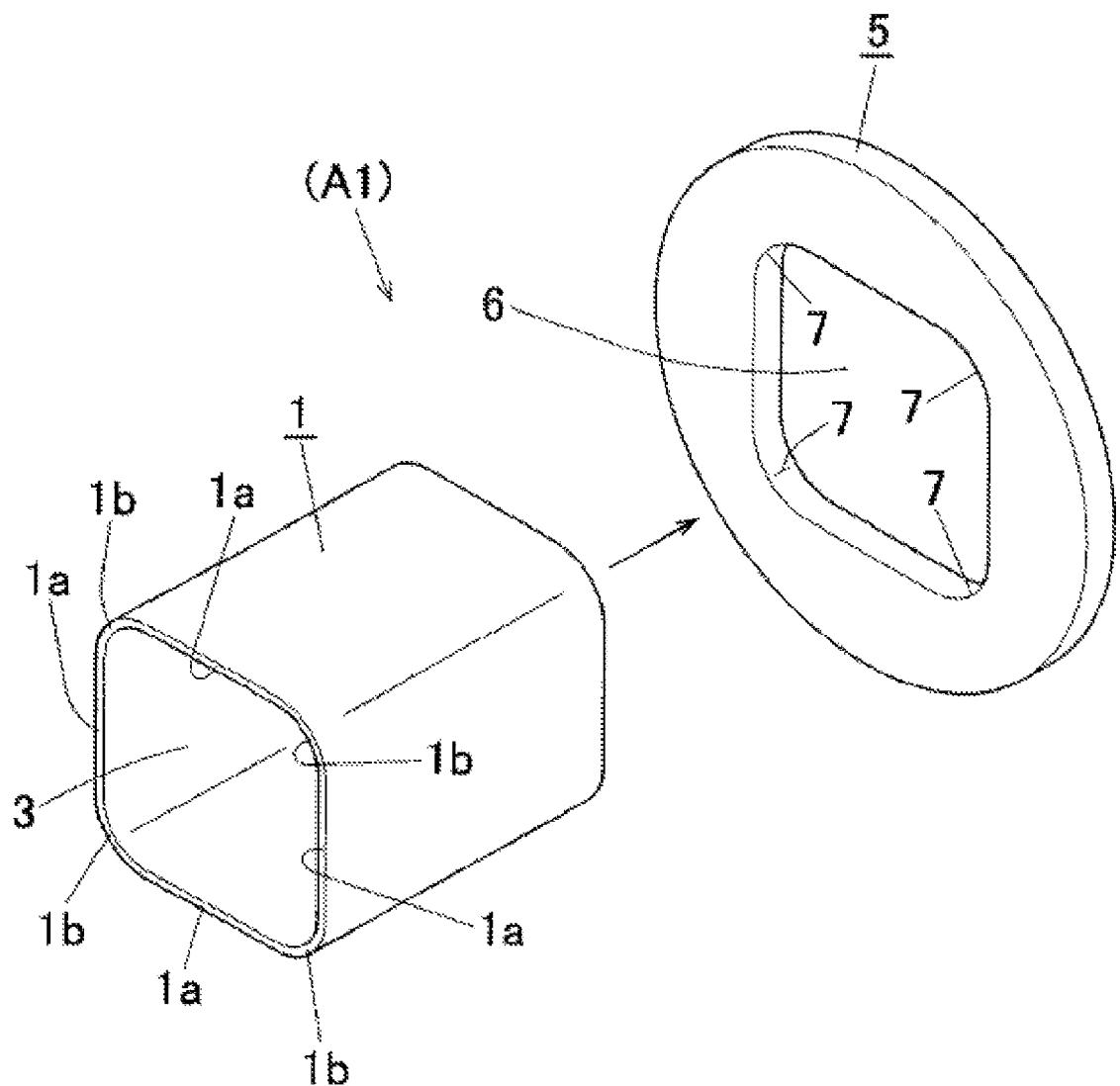
FIG. 3 is a perspective view showing a first member and a second member.

As shown in FIG. 3, the first member 1 is a tubular member polygonal in cross-section having a hollow portion 3. In this embodiment, the first member 1 is a tubular member having a quadrilateral cross-section, and more specifically, the outer peripheral surface of the first member 1 and the inner peripheral surface (hollow portion 3) of the first member 1 are both quadrilateral in cross-section. Thus, the first member 1 includes four flat wall portions 1a arranged in the circumferential direction and corner portions arranged between the two circumferentially adjacent flat wall portions 1a and 1a, i.e., the flat wall portion 1a and the corner portion 1b are arranged alternately in a circumferential direction. In addition, the corner portion 1b of the first member 1 is formed into a circular arc cross-sectional shape having a predetermined curvature radius.

The first member 1 is made of a plastically deformable material, such as, e.g., metal, more specifically, aluminum or aluminum alloy. In the present invention, however, the material for the first member 1 is not limited to aluminum and aluminum alloy, and can be, for example, metal, such as, e.g., iron, steel or copper.

The second member 5 is a plate-shaped member, and more specifically, a circular disc shaped member. Furthermore, at the center portion of the second member 5, an insertion hole 6 into which the first member 1 will be inserted is provided. The cross-section of the insertion hole 6 is formed into a shape corresponding to the cross-sectional shape of the first member 1, i.e., a quadrilateral shape. As mentioned above, the cross-section shape of each corner portion 1b of the first member 1 is formed into a circular arc shape, so the cross-section shape of each corner portion 7 of the insertion hole 6 of the second member 5 is also formed into a circular arc shape corresponding to the cross-sectional shape of each corner portion 1b of the first member 1.

The second member 5 is rigid and made of, e.g., metal, and more specifically, aluminum or aluminum alloy. In the present invention, however, the material for the second member 5 is not limited to aluminum and aluminum alloy, and can be, for example, metal, such as, e.g., iron, steel, or copper, and can be ceramics or plastic.

The length of the first member 1 is set so as to fall within, for example, 50 to 2,000 mm. The cross-sectional each side length of the first member 1 is set so as to fall within, for example, 20 to 100 mm. The curvature radius of each of the corner portions 1b of the first member 1 is set so as to fall within, for example, 5 to 45 mm. The thickness of the first member 1 is set so as to fall within, for example, 0.5 to 5 mm.

In the present invention, however, each size of the first member 1 is not limited so as to fall within the aforementioned size, and can be set arbitrarily depending on the purpose of the use and application.

The diameter of the second member 5 is set so as to fall within the range of, for example, 35 to 300 mm. The cross-sectional each side length of the insertion hole 6 of the second member 5 is set to be longer than the cross-sectional side length of the first member 1 by, for example, 0.5 to 5 mm. The curvature radius of each corner portion 7 of the insertion hole 6 of the second member 5 is set so as to fall within the range of, for example, 5 to 45 mm. The thickness of the second member 5 is set so as to fall the range of, for example, within 1 to 50 mm.

In the present invention, however, each size of the second member 5 is not limited to the abovementioned ranges, and can be set variously depending on the purpose of the use and application.

In the joint structure A1, as shown in FIG. 2, in a state in which the first member 1 is inserted into the insertion hole 6 of the second member 5, the insertion portion 2a of the first member 1 in the insertion hole 6 of the second member 5 and both side portions 2b axially adjacent to the insertion portion 2a are expanded (tube diameter expansion) as expansion scheduled portions, thus, the first member 1 and the second member 5 are joined together.

The insertion portion 2a of the first member 1 in the insertion hole 6 is slightly expanded outward. Furthermore, both portions 2b and 2b axially adjacent to the insertion portion 2a of the first member 1 in the insertion hole 6 are locally expanded outward into a circular arc shape in cross-section. Thus, the second member 5 is pinched by and between both the portions 2b and 2b.

The expansion height of each of the portions 2b and 2b axially adjacent to the insertion portion 2a of the first member 1 in the insertion hole 6 is set so as to fall within the range of, for example, 0.5 to 10 mm, and the width of this portion 2b is set so as to fall within the range of, for example, 3 to 30 mm. In the present invention, however, the expansion height and the width of the portion 2b are not limited to the abovementioned ranges.

In the joint structure A1, the second member 5 is used as, e.g., a flange to be mounted on another member. In this case, typically, a joining member insertion hole (not shown), such as, e.g., a bolt insertion hole, is formed in the second member 5. In the present invention, however, the second member 5 is not limited to a flange, and can be used as a member having, for example, a bracket or a stay.

Next, a joining device 10 for joining the first member 1 and the second member 5 according a first embodiment of the present invention will be explained.

Figure 4:
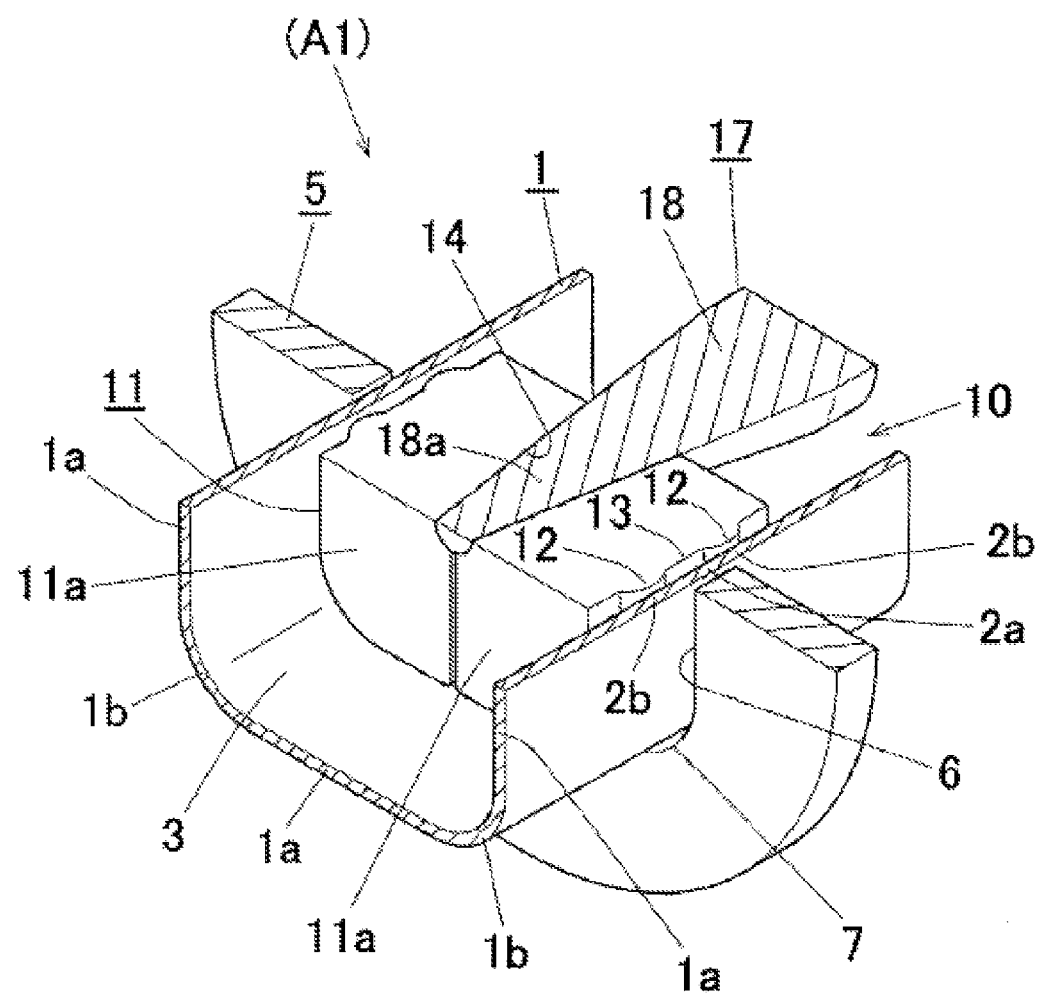
FIG. 4 is a half cross-sectional perspective view showing the state before executing the expansion work to a prescribed portion of the first member.
Figure 5:
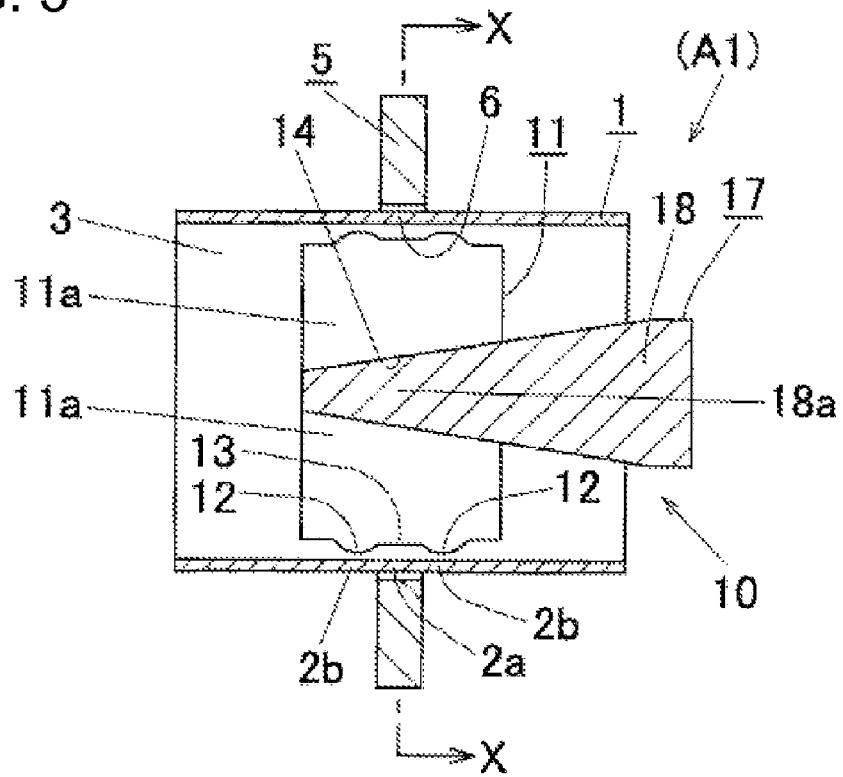
FIG. 5 is a cross-sectional view showing the state before executing the expansion work to a prescribed portion of the first member.
Figure 6:
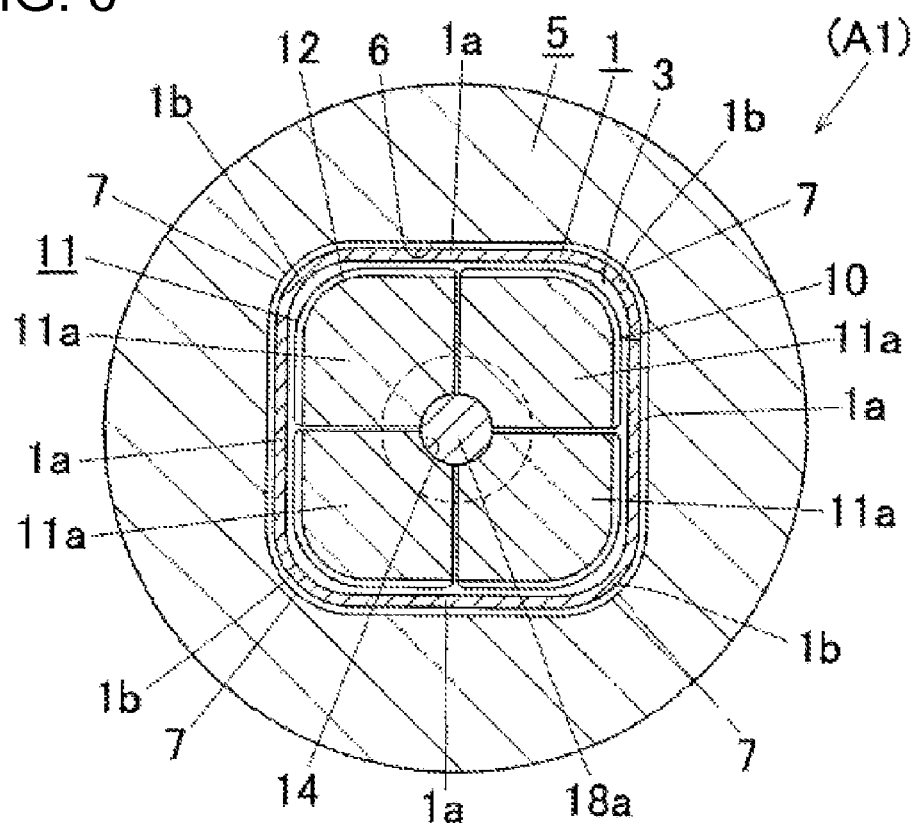
FIG. 6 is a cross-sectional view taken along the line X-X in FIG. 5.

As shown in FIGS. 4 to 6, this joining device 10 includes a split die 11 and a driving means 17.

The split die 11 is to be disposed in the hollow portion 3 of the first member 1, and as shown in FIG. 6, and formed into a cross-sectional shape corresponding to the cross-section shape of the hollow portion 3 of the first member 1. The split die 11 is split into multiple segments in the circumferential direction centering around a wedge hollow portion 14, described later, formed in a central portion of the split die 11. In this embodiment, as shown in FIG. 6, the split die 11 is split into four segments, the same number as the number of the flat wall portions 1a of the first member 1. Thus, the split die 11 is constituted by combining four segments 11a.

The split positions of the split die 11 are explained. The split die 11 is not split at positions corresponding to the corner portions 1b of the first member 1, but at positions corresponding to the flat wall portions 1a of the first member 1. More specifically, the split die 11 is split at a position corresponding to the widthwise middle portion of each flat wall portion 1a of the first member 1.

As shown in FIGS. 4 and 5, on an axial middle portion on the outer circumferential surface, the split die 11 is provided with two protruded portions 12 and 12 arranged apart from each other in the axial direction and extending along the entire circumference. Both the protruded portions 12 and 12 are used to locally outwardly expand both the portions 2b and 2b axially adjacent to the insertion portion 2a of the first member 1 in the insertion hole 6 into a circular arc shape in cross-section. Each protruded portion 12 is circular arc in cross-section.

Furthermore, in the split die 11, the diameter of the portion 13 located between both the protruded portions 12 and 12 is set to be larger than the diameter of both the axial end portions of the split die 11. The portion 13 is used to outwardly locally expand the insertion portion 2a of the first member 1 in the insertion hole 6.

Figure 9:
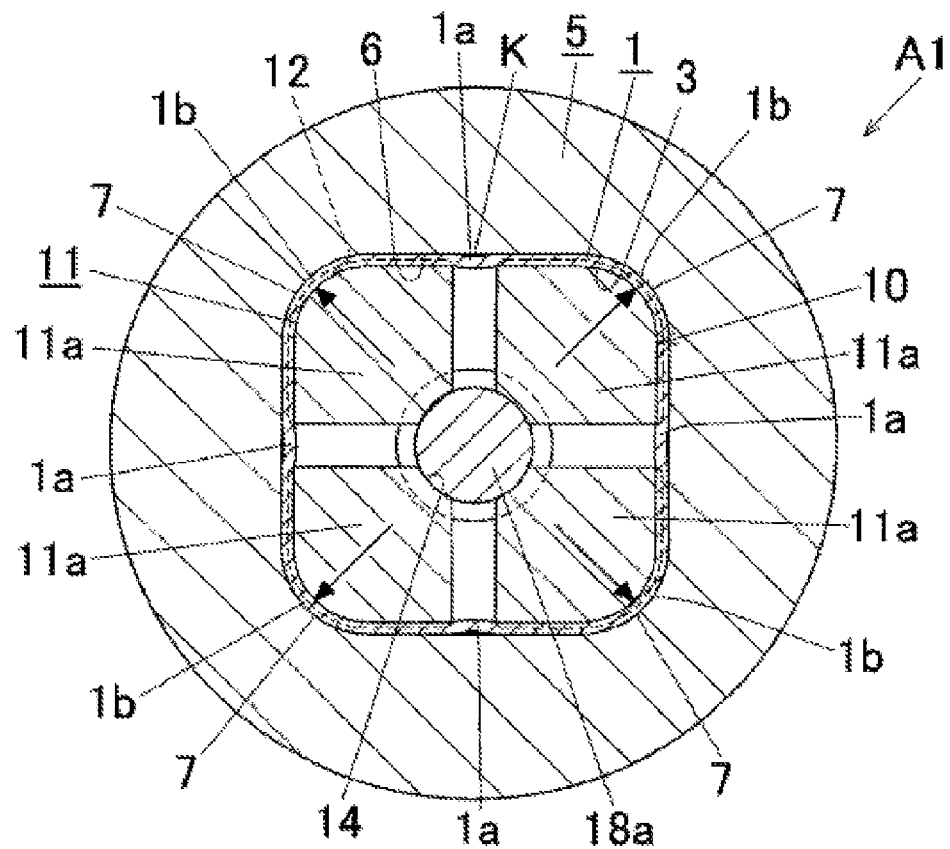
FIG. 9 is a cross-sectional view taken along the line X-X in FIG. 8.

The driving means 17 is configured to move each segment 11a of the split die 11 disposed in the hollow portion 3 of the first member 1 toward each corner portion 1b of the first member 1 radially outward of the first member 1 (see FIG. 9).

The driving means 17 has a mandrel 18. The mandrel 18 has, on the tip portion, a wedge portion 18a. The wedge portion 18a is formed into a tapered circular cone shape (or circular truncated cone). Also, the basal end portion of the mandrel 18 is connected to a driving source (not illustrated) for moving the mandrel 18 in the axial direction. As the driving source, a fluid pressure cylinder, such as, e.g., a hydraulic pressure cylinder, can be used. In the present invention, the wedge portion 18a of the mandrel 18 can be formed not into a cylindrical cone shape but into a pyramid shape (or a truncated pyramid).

In the central portion of the split die 11, the abovementioned tapered wedge hole portion 14 corresponding to the wedge portion 18a of the mandrel 18 is formed, penetrating in the axial direction of the split die 11. As shown in FIG. 6, the cross-sectional shape of the wedge hole portion 14 is circular. As mentioned above, the split die 11 is split into four segments in the circumferential direction centering around the wedge hole portion 14.

Next, the joining method for joining the first member 1 and the second member 5 using the joining device 10 will be explained.

As shown in FIGS. 4 to 6, the first member 1 is loosely inserted into the insertion hole 6 of the second member 5. Also, at a position inside the hollow portion 3 of the first member 1 corresponding to the second member 5, the split die 11 is loosely inserted and disposed. Furthermore, the wedge portion 18a of the mandrel 18 of the driving means 17 is inserted and disposed inside the wedge hole portion 14 of the center portion of the split die 11.

Figure 7:
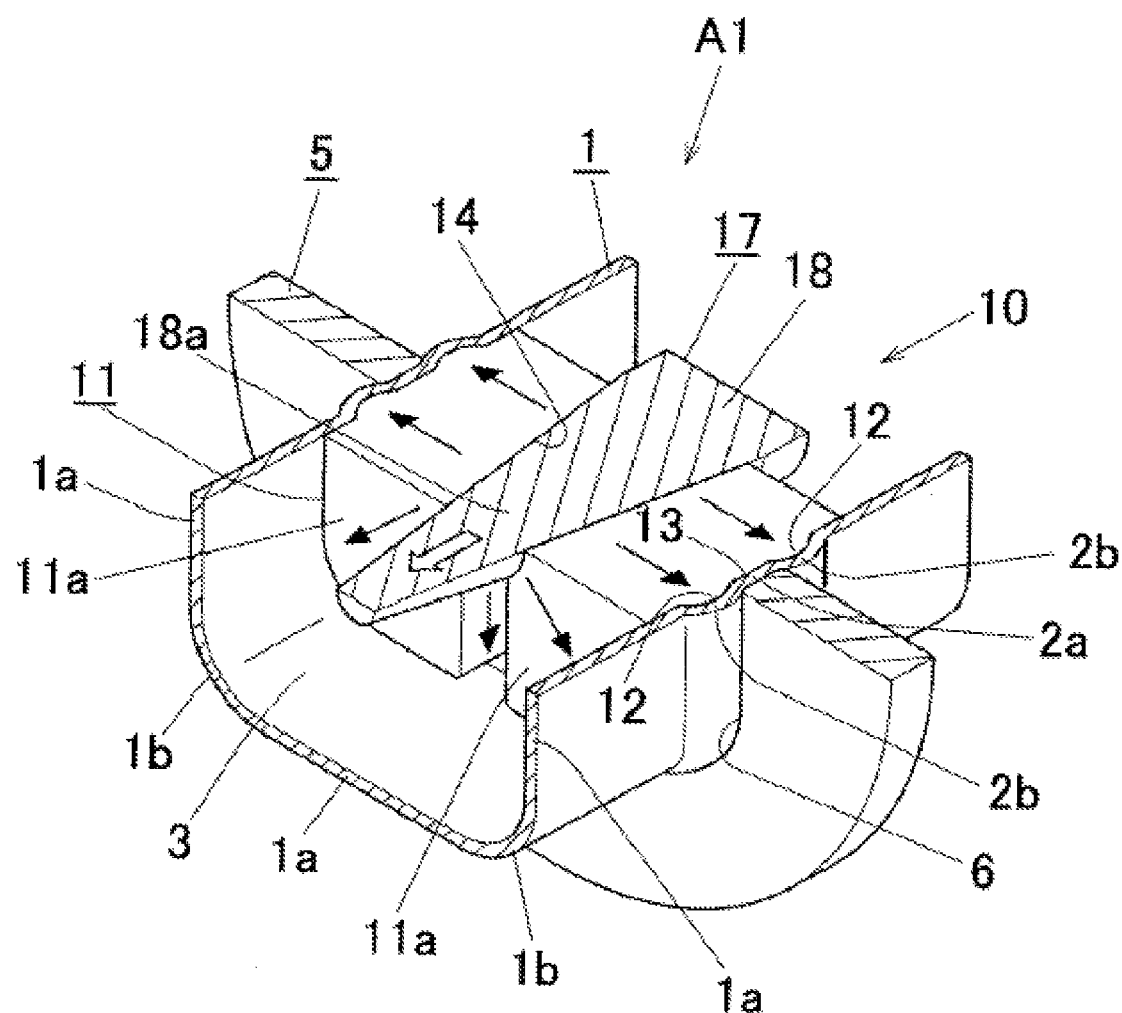
FIG. 7 is a half cross-sectional perspective view showing the state after executing the expansion work to a prescribed portion of the first member.
Figure 8:
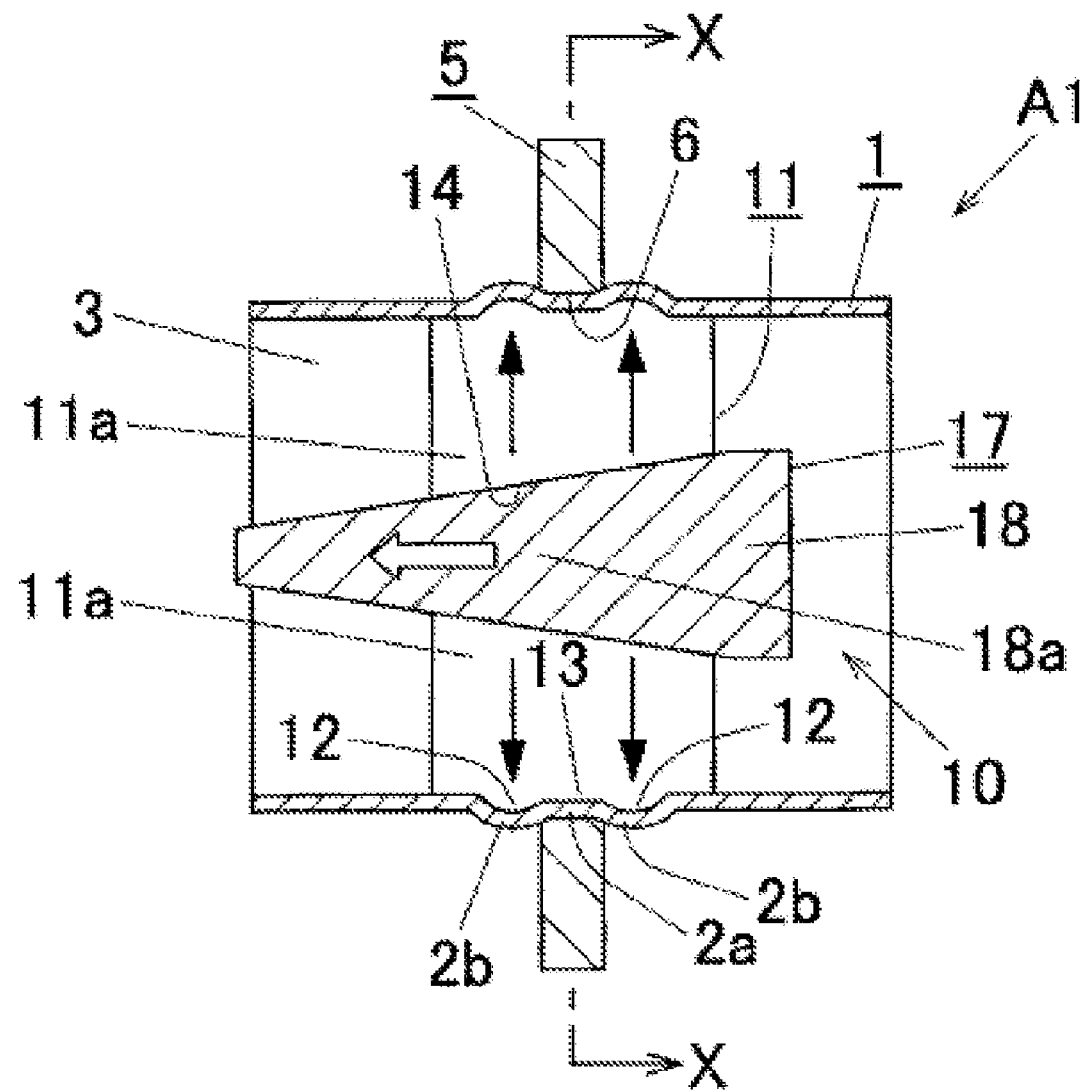
FIG. 8 is a cross-sectional view showing the state after executing the expansion work to a prescribed portion of the first member.

Next, in this state, as shown in FIGS. 7 to 9, the wedge portion 18a of the mandrel 18 is moved in the axial direction of the first member 1 to move each segment 11a of the split die 11 radially outward of the first member 1 toward each corner portion 1b of the first member 1 (see FIG. 9). As shown in FIGS. 7 and 8, the insertion portion 2a of the first member 1 in the insertion hole 6 and both portions 2b and 2b axially adjacent to the insertion portion are subjected to expansion work (tube diameter expansion work).

With this expansion work, the insertion portion 2a of the first member 1 in the insertion hole 6 and both portions 2b and 2b axially adjacent to the insertion portion 2a are plastically deformed to be expanded outwardly locally and pressed against the peripheral edge portion of the insertion hole 6 of the second member 5, and the second member 5 is elastically deformed so that the insertion hole 6 of the second member 5 expands radially outwardly. Furthermore, in accordance with the elastic deformation of the second member 5, the elastic resilience is stored in the second member 5.

Next, the wedge portion 18a of the mandrel 18 is removed from the wedge hole portion 14 of the split die 11. Then, the elastic resilience (springback force) stored in the second member 5 causes the second member 5 to be pressurized against and fixed to the outer peripheral surface of the first member 1. In this way, the second member 5 is joined to the first member 1 (more specifically, the outer peripheral surface of the first member 1).

As explained above, the split die 11 is split at a position corresponding to the a widthwise middle portion of each flat wall portion 1a of the first member 1. And at the time of executing the expansion work, each segment 11a of the split die 11 moves toward each corner portion 1b of the first member 1. Consequently, due to this expansion work, among the insertion portion 2a of the first member 1 in the insertion hole 6 and both portions 2b and 2b axially adjacent to the insertion portion 2a, especially each corner portion 1b of the insertion portion 2a and each corner portion 1b of both portions 2b and 2b axially adjacent to the insertion portion 2a are largely and firmly expanded outward. As a result, the second member 5 is firmly fixed to the first member 1.

The joining method of this first embodiment has the following advantages.

The tubular first member 1 is a tubule member quadrilateral in cross-section, and the cross-section of the insertion hole 6 of the second member 5 is formed into a shape corresponding the cross-sectional shape of the first member 1. Therefore, in a state in which the first member 1 is inserted into the insertion hole 6 of the second member 5, the twisting strength can be improved. Therefore, even if a load in the circumferential direction of the first member 1 is applied to the second member 5, the second member 5 will not easily move in the circumferential direction of the first member 1.

Furthermore, each segment 11a of the split die 11 disposed in the hollow portion 3 of the first member 1 is expanded radially outward of the first member 1 toward each corner portion 1b of the first member 1 to thereby execute the expansion work. Thus, each corner portion 1b of the first member 1 is more expanded than each flat wall portion 1a of the first member 1 and largely expanded outward. Therefore, the twisting strength is further increased. As shown in FIG. 9, even if a gap K is formed between each flat wall portion 1a of the first member 1 and the second member 5, sufficient twisting strength can be secured against the load in the circumferential direction of the first member 1.

Also, on the outer circumferential surface of the split die 11, two protruded portions 12 and 12 for partially outwardly expanding both portions 2b and 2b axially adjacent to the insertion portion 2a of the first member 1 in the insertion hole 6 are formed. Therefore, by using the split die 11 to execute the expansion work, both portions 2b and 2b axially adjacent to the insertion portion 2a of the first member 1 in the insertion hole 6 can be locally and assuredly expanded outward, which assuredly improves the pull-out strength. Therefore, even if a load in the axial direction of the first member 1 is applied to the second member 5, the second member 5 will not easily move in the axial direction of the first member 1.

Furthermore, each corner portion 1b of the first member 1 is formed into a circular arc shape in cross-section. Therefore, in the case where a load in the circumferential direction of the first member 1 is applied to the second member 5, the stress concentration on each corner portion 1b of the first member 1 can be assuredly prevented. This improves the strength dependability.

Figure 10:
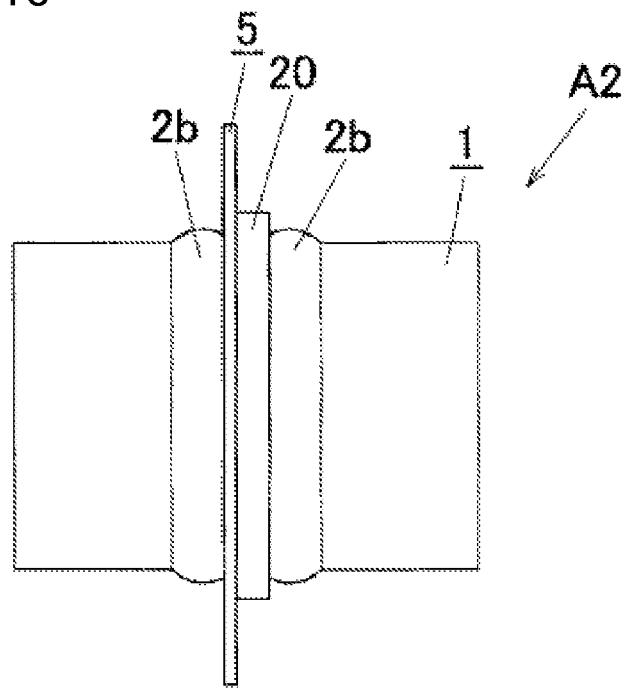
FIG. 10 is a side view showing a joint structure according to a second embodiment of the present invention.
Figure 11:
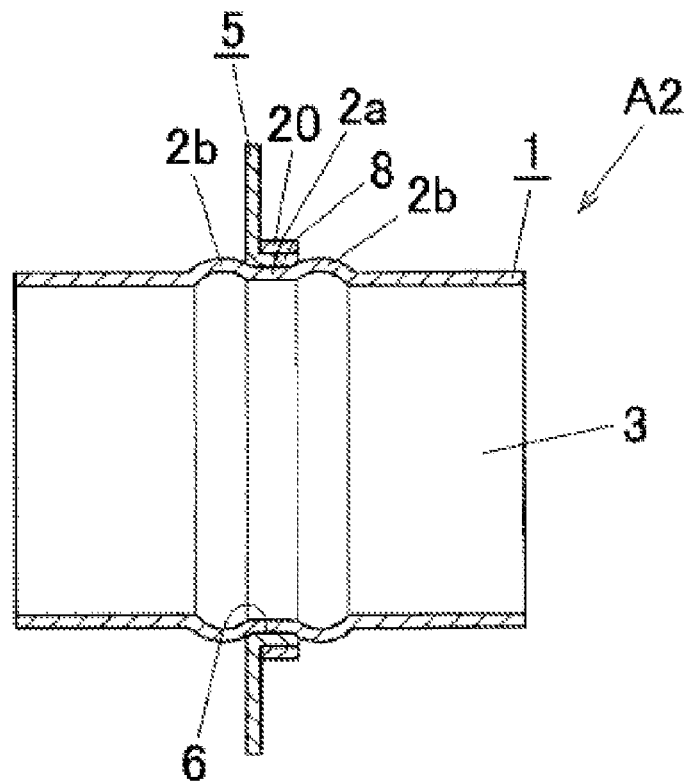
FIG. 11 is a cross-sectional view of the joint structure.

FIGS. 10 and 11 are explanatory views of a joint structure A2 according to the second embodiment of the present invention. In these diagrams, the same reference numerals are allotted to the same elements as in the joint structure A1 of the abovementioned first embodiment. The following is an explanation of the structure of the joint structure A2 of the second embodiment, focusing on the differences from the joint structure A1 of the first embodiment.

In this joint structure A2, as shown in FIG. 11, on the peripheral edge portion of the insertion hole 6 of the second member 5, a nearly angular short cylindrical shaped (angular short cylindrical shaped) plate portion 8 protruding toward one side of the axial direction (i.e., in the thickness direction of the second member 5) of the first member 1 are integrally formed along the entire circumference. This plate portion 8 is formed by bending the peripheral edge portion of the insertion hole 6 of the second member 5 into an angular or nearly angular short cylindrical shape along the entire periphery. The plate portion 8 is configured to be fitted on the outer peripheral surface of the first member 1 in a state in which the second member 5 is attached to the first member 1.

The thickness of the second member 5 and that of the plate portion 8 are set to be the same, for example, within the range of 0.5 to 10 mm. Also, the protrusion length of the plate portion 8 is set so as to fall within the range of, for example, 1 to 50 mm. In the present invention, however, each size of the second member 5 and the plate portion 8 is not limited to the abovementioned ranges.

"20" denotes an annular restraining member. The restraining member 20 is configured to prevent the plate portion 8 of the second member 5 fitted to the outer peripheral surface of the first member 1 from curling up from the outer peripheral surface of the first member 1. In this embodiment, the restraining member 20 is angular annular in shape.

The restraining member 20 is rigid. For example, it is made of metal, and more specifically, aluminum or aluminum alloy. In the present invention, however, the material of the restraining member 20 is not limited to aluminum or aluminum alloy, and can be other metals, such as, e.g., iron, steel, or copper, or it also can be plastic.

The length of each side of the cross-section of the hollow portion of the restraining member 20 is set to be longer than the length of each side of the cross-section of the plate portion 8 of the second member 5 by, for example, 0.5 to 5 mm. The width of the restraining member 20 (i.e., the length of the restraining member 20 along the axial direction of the first member 1) is set so as to fall within the range of, for example, 0.5 to 1 times of the protruded length of the plate portion 8 of the second member 5. The thickness of the restraining member 20 is set to be a thickness capable of withstanding a load to be applied to the restraining member 20 at the time of the expansion work, for example, within the range of 1 to 10 mm. In the present invention, however, each size of the restraining member 20 is not limited to the abovementioned ranges.

In this joint structure A2, in a state in which the plate portion 8 of the second member 5 is fitted to the outer peripheral surface of the first member 1, the insertion 2a of the first member 1 in the insertion hole 6 and both portions 2b and 2b axially adjacent to the insertion portion are expanded, whereby the second member 5 and the first member 1 are joined. Furthermore, the restraining member 20 is fixed to the outer surface of the plate portion 8, i.e., the restraining member 20 is outwardly fitted to the plate portion 8.

The following is an explanation of the joining method for joining the first member 1 and the second member 5 according to the second embodiment, focusing the differences from the joining method of the abovementioned first embodiment.

The first member 1 is inserted into the insertion hole 6 of the second member 5, and the plate portion 8 of the second member 5 is fitted and disposed on the outer peripheral surface of the first member 1. In this state, there is a slight gap between the plate portion 8 of the second member 5 and the first member 1. Furthermore, the restraining member is disposed so that the plate portion 8 of the second member 5 is inserted in the hollow portion of the restraining member 20 and the plate portion 8 surrounds the outer surface side of the plate portion 8. In this state, the plate portion 8 is restrained by the restraining member 20 so that it does not accidentally curl up from the outer peripheral surface of the first member 1 at the time of the expansion work. Also, there is a slight gap between the plate portion 8 and the restraining member 20. Next, the split die 11 is inserted and disposed into the hollow portion 3 of the first member 1.

Next, in this state, in the same manner as in the joining method of the first embodiment, each segment 11a of the split die 11 is moved radially outward of the first member 1 toward each corner portion 1b of the first member 1 to thereby execute the expansion work of the inserted portion 2a of the first member 1 in the insertion hole 6 and both portions 2b and 2b axially adjacent to the insertion portion 2a. As a result, the second member 5 is joined to the first member 1, and furthermore, the restraining member 20 is fixed to the outer surface of the plate portion 8 of the second member 5, i.e., the restraining member 20 is fitted to the outside of the plate portion 8 of the second member 5. At the time of the expansion work, the restraining member 20 restrains the plate portion 8 of the second member 5 from accidentally curling up from the outer peripheral surface of the first member 1.

The joining method of the second embodiment has the following advantages.

By fitting and disposing the plate portion 8 of the second member 5 to the outer peripheral surface of the first member 1, the contact area of the second member 5 and the first member 1 increases, which further improves the connection strength. Furthermore, the increase in the contact area of the first member 1 and the second member 5 is not accomplished by increasing the thickness of the second member 5 but by forming the plate portion 8 on the peripheral edge portion of the insertion hole 6 of the second member 5. This enables the weight reduction of the joint structure A2.

Furthermore, by executing the expansion work in a state in which the restraining member 20 prevents the plate portion 8 of the second member 5 from curling up from the outer peripheral surface of the first member 1, the plate portion 8 can be assuredly brought into fact-to-face contact with the outer peripheral surface of the first member 1, resulting in assured improvement of the joining strength.

Figure 12:
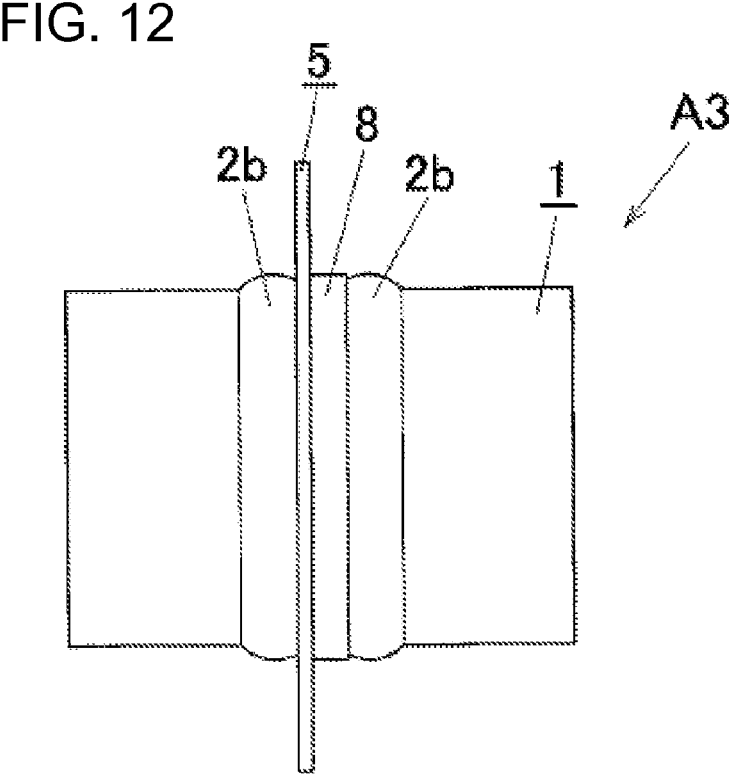
FIG. 12 is a side view of a joint structure according to a third embodiment of the present invention.
Figure 13:
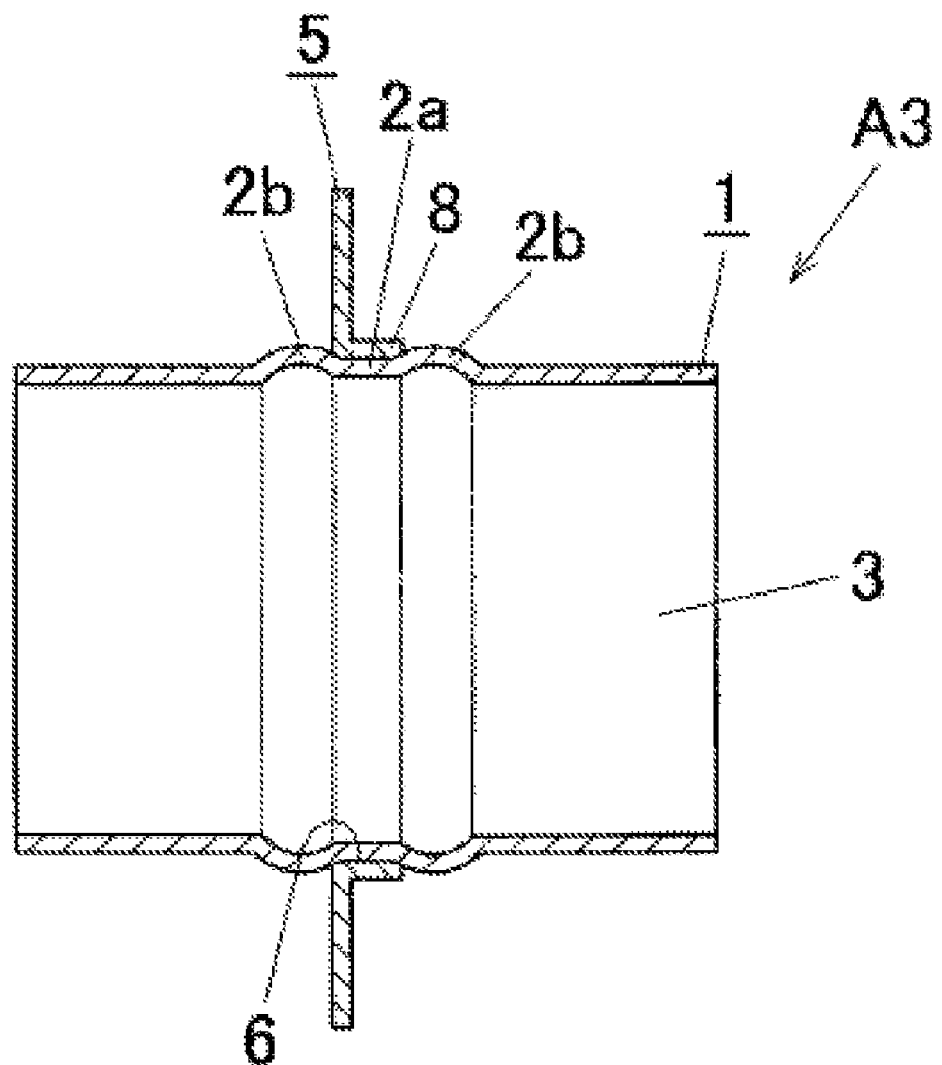
FIG. 13 is a cross-sectional view of the joint structure.

FIGS. 12 and 13 are explanatory views showing a joint structure A3 according to the third embodiment of the present invention. In these drawings, the same reference numerals are allotted to the same elements in the joint structures A1 and A2 of the abovementioned first and second embodiments.

In this joint structure A3 of the third embodiment, the restraining member 20 used in the joint structure A2 of the second embodiment is removed after the expansion work.

In the joint structure A3, since the restraining member 20 is removed, the weight of the joint structure A3 has been further reduced.

In the present invention, the restraining member 20 can be an annular shape and split into multiple segments in the circumferential direction, but not limited to such an annular shape.

Several embodiments of the present invention have been described, but the present invention is not limited to the abovementioned embodiments.

For example, in the present invention, the first member 1 can be a tubular member polygonal, such as, e.g., triangular, pentagonal, hexagonal, heptagonal, or octagonal, in cross-section.

Also, in the present invention, the second member 5 is not limited to a circular disc shaped member, and can be, for example, an angular disc shaped member or a tubular member.

In the present invention, on the peripheral surface of the insertion hole 6 of the second member 5, grooves (e.g., knurled grooves) for improving the joint strength by increasing the friction force can be formed, or biting protrusions or dented portions can be formed.

EXAMPLES

Next, concrete examples of the present invention will be explained. It should be noted that the present invention is not limited to these examples.

Example

A joint structure A1 shown in the FIGS. 1 and 2 was produced by joining the first member 1 and the second member 5 in accordance with the joining method of the first embodiment shown in FIGS. 1 to 9.

The material of the first member 1 was aluminum alloy of JIS (Japanese Industrial Standards) A6N01-T5. Also, the length of the first member 1 was 20 mm, the size of the cross-section (outer diameter) was 78×78 mm, the curvature radius of the corner portion 1b was 20 mm, and the radial thickness was 2 mm.

The material used for the second member 5 was the same as the first member 1. Also, for the second member 5, the diameter was 130 mm, the cross-sectional size of the insertion hole 6 was 80×80 mm, the curvature radius of the corner portion 7 was 22 mm, and the thickness was 10 mm.

Also, in the joint structure A1, the protruded height of both portions 2b and 2b axially adjacent to the insertion portion 2a of the first member 1 in the insertion hole 6 was 3 mm, and the width was 15 mm.

Comparative Example

The first member 1 and the second member 5 were joined in the same manner as in the aforementioned Example except that a tubular member having a circular cross-section was used as the first member 1, The material used for the first member 1 was the same as the abovementioned Example. Also, in the first member 1, the length was 200 mm, the outer diameter was 85 mm, and the radial thickness was 2 mm.

The material used for the second member 5 was the same as the abovementioned embodiment. Also, the diameter of the second member 5 was 130 mm, and the radial thickness was 10 mm. Also, the cross-section of the insertion hole of the second member 5 was circular in cross-sectional shape, and its diameter was 89 mm.

[Comparison of Twisting Strength]

The twisting strength of the joint structure A1 of Example and the twisting strength of the joint structure of Comparative Example were compared. The twisting strength was measured in the following manner.

A load in the circumferential direction of the first member 1 was applied to the second member 5 with the first member 1 fixed. The torque measured when the second member 5 was rotated by 0.5 degrees in the circumferential direction of the first member 1 was defined as the twisting strength.

The twisting strength of the joint structure of Comparative Example was about 300 Nm.

On the other hand, in the joint structure A1 of the embodiment, the twisting strength was about 650 Nm. In addition, as a reference, before expanding the prescribed portions 2a, 2b, and 2b of the first member 1 of the joint structure A1 of Example, the measured twisting strength was about 250 Nm.

From the above results, it was confirmed that the twisting strength of the joint structure A1 of Example was dramatically higher than the twisting strength of the joint structure of Comparative Example.

The reasons that the twisting strength of the joint structure A1 of the embodiment is markedly higher are as follows. That is, the improvement of the twisting strength obtained by inserting the tubular first member 1 polygonal in cross-section shape in the insertion hole 6 of the second member 5 having a cross-section shape corresponding to the cross-section of the first member 1 and the improvement of the twisting strength obtained by joining the second member 5 to the first member 1 act in a synergetic manner, which remarkably enhanced the twisting strength.

This application claims priority to Japanese Patent Application No. 2006-105699 filed on Apr. 6, 2006, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The present invention can be applied to a joining method and a joining device for joining members used as, for example, piping or parts, such as, e.g., a steering support beam, a steering column holder, a muffler, a frame, a propeller shaft, a suspension arm, other parts for an automobile, or products other than automobiles.

The invention claimed is:

1. A method for joining a first member and a second member, wherein the method comprises the steps of inserting the first member made of a tubular member having a hollow portion into an insertion hole provided in the second member, disposing a split die circumferentially split into multiple segments in the hollow portion of the first member, and then moving each of the segments of the split die radially outward of the first member to execute an expansion work of an insertion portion of the first member inserted in the insertion hole and both portions of the first member axially adjacent to the insertion portion to join the first member and the second member, characterized in that,
the first member is a tubular member polygonal in cross-section,
the insertion hole of the second member is formed into a cross-sectional shape corresponding to a cross-sectional shape of the first member,
the split die is split at each position corresponding to each flat wall portion of the first member, and
each segment of the split die disposed in the hollow portion of the first member is moved radially outward of the first member toward each corner portion of the first member to execute the expansion work.

2. The method of joining members as recited in claim 1, wherein the split die has, at its outer peripheral surface, two protruded portions for making both portions of the first member axially adjacent to the insertion portion expand outwardly locally.

3. The method of joining members as recited in claim 1, wherein each corner portion of the first member is formed into an approximately circular arc shape in cross-section.

4. The method of joining members as recited in claim 1, wherein the second member has a plate portion integrally protruded from a peripheral edge portion of the insertion hole in an axial direction of the first member, and
wherein the expansion work is executed in a state in which the plate portion of the second member is fitted on an outer peripheral surface of the first member and the plate portion is prevented by a restraining member positioned on an outer surface of the plate portion from curling up from the outer peripheral surface of the first member.

5. The method of joining members as recited in claim 1, wherein the expansion work is executed so that each corner portion of the first member is expanded outward more than each flat wall portion by moving each segment of the split die disposed in the hollow portion of the first member radially outward of the first member toward each corner portion of the first member.

6. The method of joining members as recited in claim 1, wherein the division number of the split die is the same as the number of the flat wall portions of the first member.

7. The method of joining members as recited in claim 1, wherein the split die is split at a position corresponding to a widthwise intermediate portion of each flat wall portion of the first member.

8. A joint structure for joining members, wherein a first member made of a tubular member having a hollow portion is inserted into an insertion hole formed in a second member, an insertion portion of the first member in the insertion hole of the second member and both portions of the first member axially adjacent to the insertion portion are expanded, so that the first member and the second member are joined, characterized in that
the first member is a tubular member polygonal in cross-section,
the insertion hole of the second member is formed into a cross-sectional shape corresponding to a cross-sectional shape of the first member, and
each corner portion of the first member is expanded outward more than each flat wall portion.

9. The joint structure for joining members as recited in claim 8, wherein both portions axially adjacent to the insertion portion of the first member in the insertion hole of the second member are expanded locally outward.

10. The joint structure for joining members as recited in claim 8, wherein each corner portion of the first member is formed into an approximately circular arc shape in cross-section.

11. The joint structure for joining members as recited in claim 8, wherein the second member has a plate portion integrally protruded from a peripheral edge portion of the insertion hole in an axial direction of the first member, and
wherein an annular restraining member for restraining the plate portion of the second member from curling up from the outer peripheral surface of the first member is secured to the plate portion in an outwardly fitted manner.

12. A joining device for joining a first member and a second member, equipped with a split die circumferentially split into multiple segments, wherein, in a state in which the first member made of a tubular member is inserted into an insertion hole of the second member, an expansion work of expanding an insertion portion of the first member in the insertion hole and both portions of the first member axially adjacent to the insertion portion is executed by moving each segment of the split die disposed in the hollow portion of the first member radially outward of the first member, characterized in that
the split die is split at each position corresponding to each flat wall portion of the first member which is a tubular member polygonal in cross-section,
the insertion hole of the second member is formed into a cross-sectional shape corresponding to a cross-sectional shape of the first member, and
in a state in which the split die is disposed in the hollow portion of the first member, each segment of the split die is moved radially outward of the first member toward each corner portion of the first member.

13. The joining device as recited in claim 12, wherein the split die has, at its outer peripheral surface, two protruded portions for making both portions of the first member axially adjacent to the insertion portion expand locally outward.

14. The joining device as recited in claim 12, wherein in a state in which the split die is disposed in the hollow portion of the first member, each segment of the split die is moved radially outward of the first member toward each corner portion of the first member to thereby expand each corner portion of the first member outward more than each flat wall portion.

15. The joining device as recited in claim 12, wherein the division number of the split die is the same as the number of the flat wall portions of the first member.

16. The joining device as recited in claim 12, wherein the split die is split at a position corresponding to a widthwise intermediate portion of each flat wall portion of the first member.

\* \* \* \* \*